United States Patent [19]

Laurenson, Jr.

[11] Patent Number: 4,837,153
[45] Date of Patent: * Jun. 6, 1989

[54] COMPOST AIR INJECTION AND EVACUATION SYSTEM WITH IMPROVED AIR CONTROL

[76] Inventor: John G. Laurenson, Jr., 5480 River Trail Rd. South, Jacksonville, Fla. 32211

[*] Notice: The portion of the term of this patent subsequent to Oct. 18, 2000 has been disclaimed.

[21] Appl. No.: 643,080

[22] Filed: Aug. 22, 1984

[51] Int. Cl.[4] .................. C12N 1/00; C12M 1/00; C12M 1/04; C05F 9/04
[52] U.S. Cl. .................. 435/243; 435/287; 435/313; 71/9; 261/122; 261/65
[58] Field of Search ............ 435/243, 287, 313; 71/9; 422/184; 261/122, 44.2, 65; 210/221.2, 620, 323.2, 346, 347, 457

[56] References Cited

U.S. PATENT DOCUMENTS

| | | | |
|---|---|---|---|
| 1,920,719 | 8/1933 | Stich | 435/313 X |
| 2,744,632 | 5/1956 | Gardes | 210/323.2 X |
| 2,867,521 | 1/1959 | Jeffreys . | |
| 2,884,135 | 4/1959 | Nowak | 210/457 |
| 2,897,601 | 8/1959 | Hulton et al. . | |
| 3,114,622 | 12/1963 | Hardy . | |
| 3,323,896 | 6/1967 | Brown . | |
| 3,357,812 | 12/1967 | Snell . | |
| 3,540,837 | 11/1970 | Pascucci . | |
| 3,756,784 | 9/1973 | Pittwood . | |
| 3,895,916 | 7/1975 | Rosner . | |
| 3,960,537 | 6/1976 | Kaelin . | |
| 4,062,770 | 12/1977 | Kneer . | |
| 4,098,695 | 7/1978 | Novotny | 210/457 X |
| 4,146,381 | 3/1979 | Willisch et al. . | |
| 4,163,724 | 8/1979 | Muller et al. | 210/323.2 |
| 4,203,755 | 5/1980 | Ruckstuhl . | |
| 4,226,832 | 10/1980 | Roumens . | |
| 4,236,910 | 12/1980 | Norin et al. . | |
| 4,267,039 | 5/1981 | Ryan | 210/767 |
| 4,288,241 | 9/1981 | Shelef . | |
| 4,369,149 | 1/1983 | Violett | 261/44.2 |
| 4,384,878 | 5/1983 | Nordlund et al. | 435/313 X |
| 4,410,349 | 10/1983 | Laurenson, Jr. . | |
| 4,436,817 | 3/1984 | Nemetz | 435/313 |
| 4,521,517 | 6/1985 | Gauthier | 435/313 |

FOREIGN PATENT DOCUMENTS 0873919 10/1981 U.S.S.R. .................. 435/313

Primary Examiner—Esther M. Kepplinger
Assistant Examiner—Randall E. Deck
Attorney, Agent, or Firm—Silverman, Cass, Singer & Winburn, Ltd.

[57] ABSTRACT

The present invention provides a method and apparatus with improved fluid flow control for economical and efficient composting. The improved fluid flow control is provided by a lance having at least two separate fluid flow zones to provide a fluid flow profile in the compost. The flow zones are provided by an outer porous wall tube with a control insert tube therein having a plurality of openings along the length thereof and spaced from the wall by gaskets to form the flow zones. The lances can be coupled to a manifold for even fluid distribution throughout the compost. The manifold is designed to direct fluid flow to a portion of the lances while simultaneously removing fluid flow from the other portion of lances. This creates substantially uniform patterns of fluid injection and evacuation for uniform composting, reduced energy requirements and greater control of process conditions. Further, reversal of the fluid flow enhances control of process conditions and adds an automatic self cleaning aspect to the apparatus.

6 Claims, 3 Drawing Sheets

FIG. 5
FIG. 6
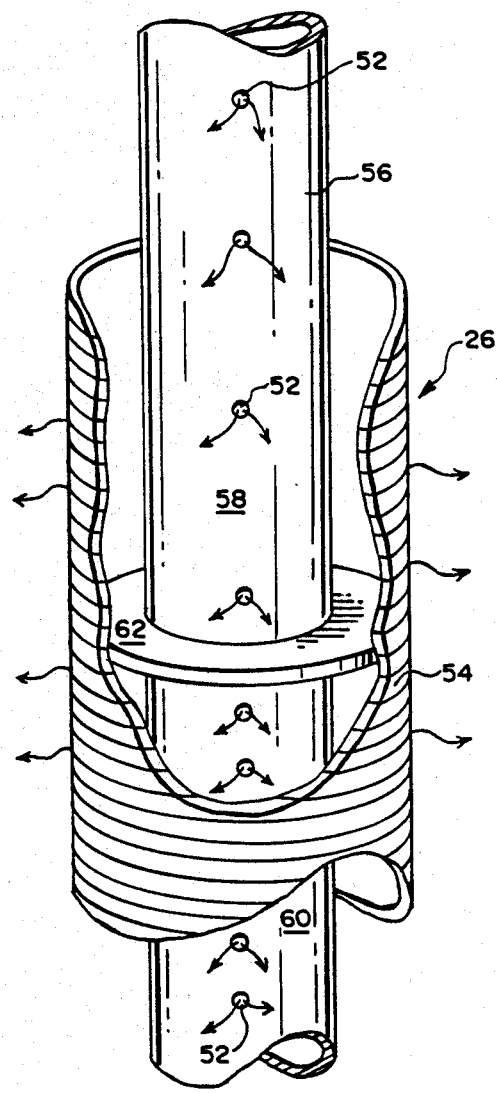
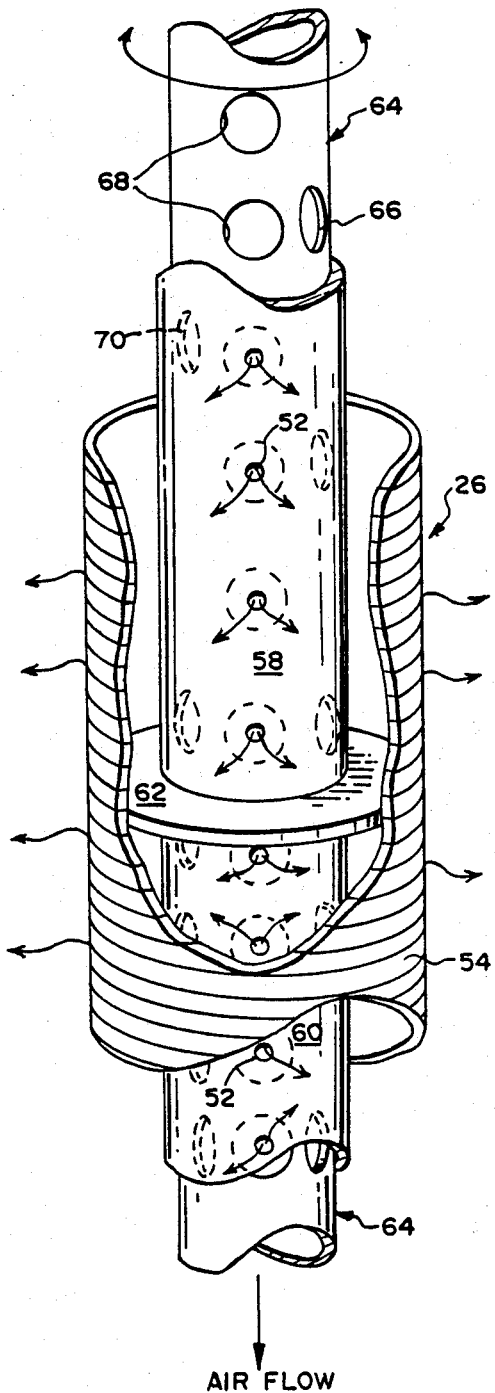

COMPOST AIR INJECTION AND EVACUATION SYSTEM WITH IMPROVED AIR CONTROL

BACKGROUND OF THE INVENTION

The present invention relates to a new and improved method and apparatus for composting. More particularly, the invention relates to an improved compost air control distribution method and system in compost pile reactors.

It has long been recognized that vast quantities of organic waste materials are being produced annually. As the world's population increases so does its capacity to produce waste materials. The disposal of these waste materials represent difficult disposal problems. Their disposal takes up valuable land, and monopolizes large amounts of time, energy, effort and capital to overcome the burden of the ever increasing quantities of organic waste material.

Composting provides an important part of the solution to reduce the problems associated with organic waste material disposal. Further, composting can provide materials that serve as important basic building block materials for such industries as the construction industry and the agriculture industry.

Composting for the most part is a time consuming, energy intensive, non uniform process. Various composting apparatus and methods are shown in U.S. Pat. Nos. 3,114,622; 3,357,812; and 4,203,755.

U.S. Pat. No. 3,114,622, issued Dec. 17, 1963 to W. Hardy, discloses an apparatus utilized as a waste material converter. The converter includes a plurality of screw augers having holes therein for the introduction of air into the waste pile. U.S. Pat. No. 3,357,812, issued Dec. 12, 1967 to J. R. Snell, discloses an apparatus for composting organic waste material utilizing a fixed pipe system located beneath the composting pile for accomplishing reversible air flow. U.S. Pat. No. 4,203,755, issued May 20, 1980 to K. Ruckstuhl, discloses an apparatus for treating waste material wherein a plurality of pipes are disposed within the composting mass for the discharge of gaseous products of decomposition.

Applicant's previous invention provides a device that equalizes air distribution throughout the compost pile as set forth in U.S. Pat. No. 4,410,349, issued July 8, 1983 to Applicant. This equalization reduces air pressure thereby reducing horsepower, and the associated energy needed to generate the required air distribution. The air distribution equalization enhances process controls and removes or inserts moisture in the system, as desired to improve the composting efficiency. Further, the device reduces the overall length of the process air path to prevent compost pile hot spots and dead spots to provide a more uniform composting process. The present invention provides improved fluid flow control for the air distribution lances utilized in compost piles.

SUMMARY OF THE INVENTION

The present invention provides a new and improved fluid flow control method and apparatus for the composting of organic waste material. The improved fluid flow control is provided by a lance hanving at least two separate fluid flow zones to provide a fluid flow profile in the compost. The flow zones are provided by an outer porous wall tube with a control insert tube therein, having a plurality of openings along the length thereof and spaced from the wall by gaskets to form the separate flow zones. The control insert tube can also include an internal tube valve therein, which allows for adjustment of the fluid flow through the insert openings.

The composting apparatus of the present invention preferably includes a plurality of the lances of the invention coupled to a manifold system for the injection and evacuation of fluid or air flow in distinct substantially uniform injection and evacuation patterns substantially equally spaced from one another. The manifold defines the injection and evacuation patterns in a substantially vertical plane, while the lances define the patterns in a horizontal plane.

The injection and evacuation patterns of fluid or air flow reduces the length of the process fluid path. This reduces the overall system pressure drop. It also reduces the possibility of short circuiting which causes hot spots and dead spots in the composting mass and adds to the uniformity of the composting process. Further, due to the pressure drop less horsepower is required to drive the fluid through the system and therefore less energy is required.

The manifold and lances are sized and arranged in accordance with the requirements of the mass to be composted as well as the size and shape of the compost containment structure. This adds flexibility and adaptability to the system. The lances of the apparatus are made from stainless steel or any non corrosive easily cleanable material.

In addition to the easily maintainable and cleanable aspects of the apparatus and its adaptability to various process conditions, the apparatus is designed to either manually or automatically reverse fluid or air flow. By reversing the fluid flow of the apparatus the lances are benefited by a self cleaning action. Further, the reversal of fluid flow allows greater process control for more uniform composting.

BRIEF DESCRIPTION OF THE DRAWINGS

FIG. 5 is a partial fragmentary elevational view of a detailed embodiment of the lances of the present invention.

FIG. 6 is a partial fragmentary elevational view of a second embodiment of the lances of the present invention.

DETAILED DESCRIPTION OF THE DRAWINGS

FIGS. 1–4 are a general description of a distribution system similar to that embodied in U.S. Pat. No. 4,410,349. The system embodies the lances of the present invention which are specifically illustrated in FIGS. 5 and 6 and can replace the prior lances described in U.S. Pat. No. 4,410,349.

Figure 1:
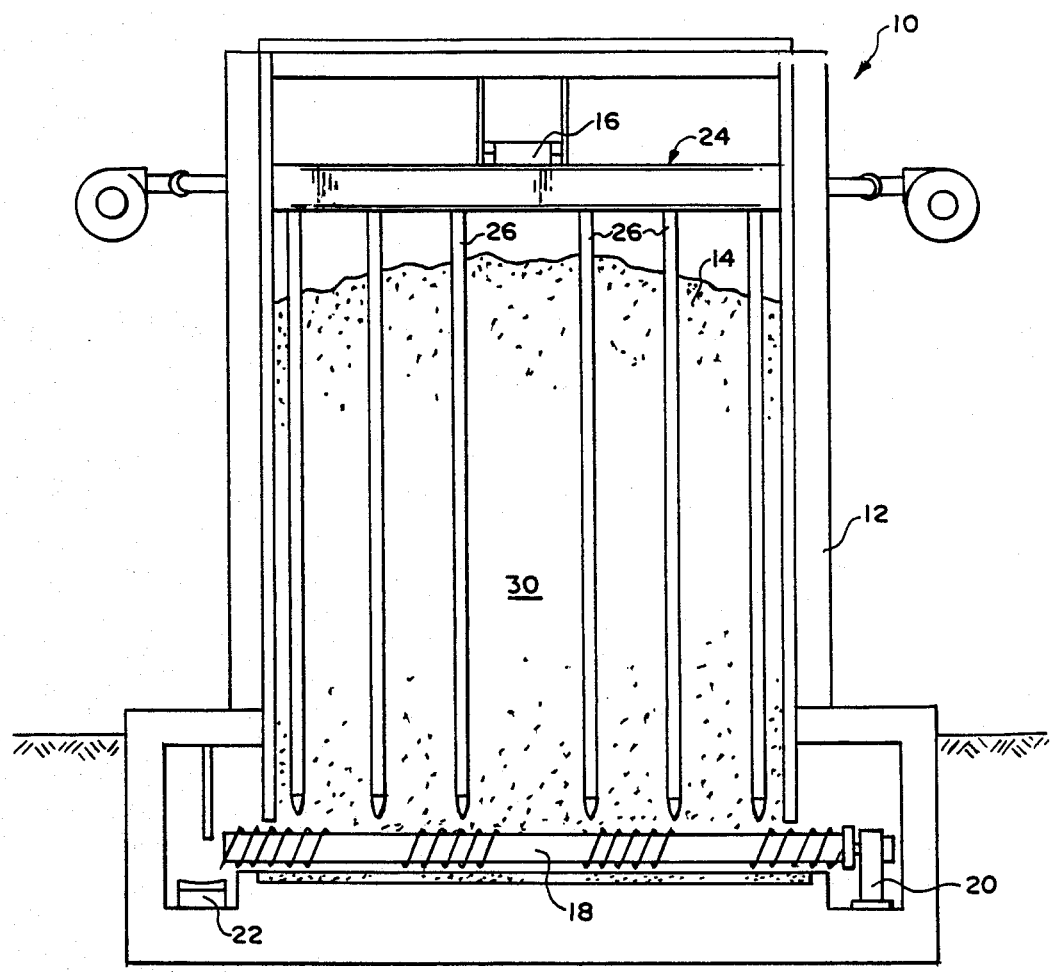
FIG. 1 is a vertical sectional view of a processing structure embodying the present invention.

Referring now to FIG. 1, there is illustrated a compost air injection and evacuation system 10 which includes a containment structure 12 housing the fluid or air distribution system. The containment structure 12 receives material 14 to be composted by an infeed conveyor and distributor 16, located near the upper portion of the structure 12. Once composted the finished product is discharged near the bottom portion of the containment structure 12 by a discharge screw 18 driven by a suitable drive system 20. The finished product is discharged onto a discharge conveyor 22 adapted to carry the material to loading and handling facilities for further processing or shipping.

The containment structure 12 as depicted in FIG. 1 is basically rectangular in configuration; however the air distribution system 10 incorporates adaptability and flexibility so as to be utilized in containment structures of various sizes and shapes, such as circular structures, and A-Frame structures, for example. Further, the air distribution system may also be used in open pile compost arrangements.

Figure 2:
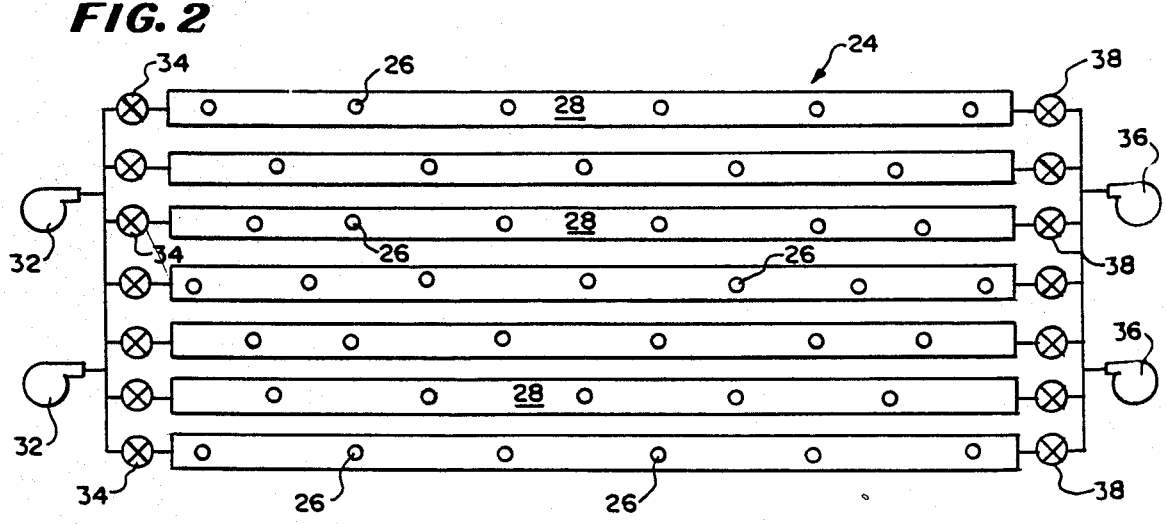
FIG. 2 is a section taken along line 2—2 of FIG. 1.
Figure 3:
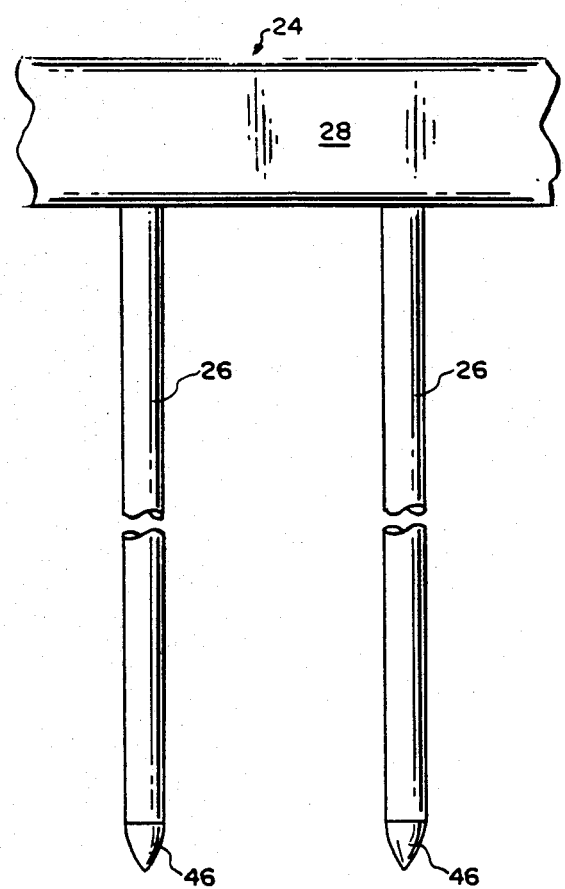
FIG. 3 is a partial fragmentary elevational view of a portion of the manifold and lances.

The fluid or air distribution system 10 includes a manifold 24 for directing fluid flow towards and away from a plurality of lances 26 (FIGS. 1 and 2). The manifold 24 is situated near the upper end portion of the containment structure 12 and is suspended in a substantially horizontal plane. The lances 26 are coupled to the manifold 24 at various points along the length of a plurality of box beams 28 and project downward into the material 14 in a compost pile 30.

The manifold 24 is constructed so as to deliver fluid flow to the lances 26 by one or more air handlers or blowers 32 through one or a plurality of manual or automatic valves 34. The fluid flow can be reversed to remove fluid from the lances 26 and hence the compost pile 30 by a second set of exhaust blowers 36 and valves 38. This creates a substantially uniform pattern of fluid injection into and a substantially uniform pattern of fluid evacuation from the compost pile 30 through the lances 26.

The uniform patterns hereinabove discussed are designed to reduce the length of the process fluid path through the compost pile 30. This reduction in length reduces the overall system pressure drop which reduces the pressure needed to circulate the fluid. Less fluid pressure means less horsepower required which translates into a substantial energy savings.

Further, the uniform fluid patterns decrease the possibility of short circuiting which causes reactor hot spots and dead spots which create non-uniformity of processing in the compost pile. Also the uniform fluid patterns lend a greater ability to control process conditions for greater efficiency in composting.

The air handlers 32 and 36 and the valves 34 and 38 are adapted to either manually or automatically, attendant to sensed process condition or programmed timing sequence, reverse the fluid flow in the manifold 24. The fluid flow reversal changes the fluid flow within the compost pile 30, but still maintains substantially uniform patterns of fluid injection and fluid evacuation. This fluid flow reversal further allows greater control over the composting operation to reduce composting time and obtain a more uniform end product.

Figure 4:
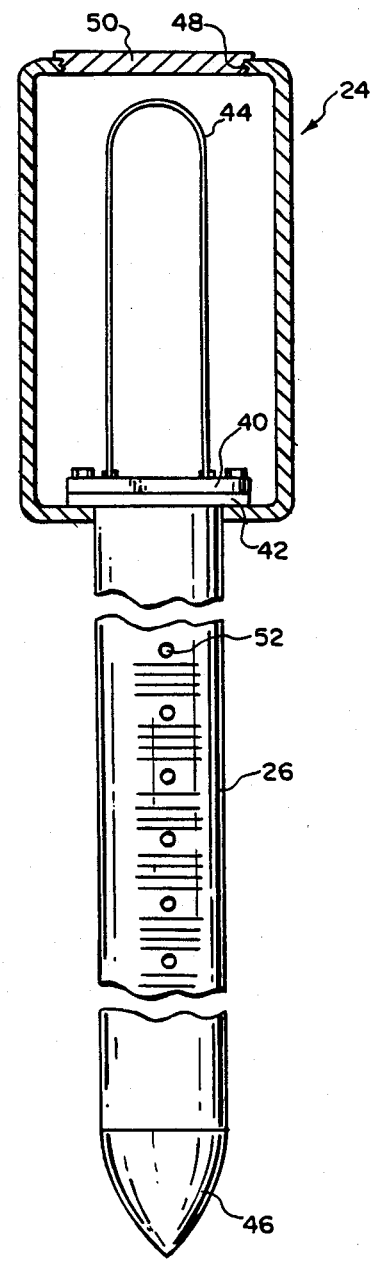
FIG. 4 is a partial fragmentary elevational view of another portion of the manifold and lances.

The manifold 24 and the lances 26 can best be seen in FIS. 3 and 4. In FIG. 4 the lance 26 is coupled to the manifold 24 by a flange and gasket arrangement 40 and 42 or any similar quick disconnect arrangement. The lance 26 rests on the bottom of the manifold beam 28 on the gasket 42, which preferably is chosen to be thick enough to provide some lateral movement to the lance 26 while maintaining a fluid tight seal with the beam 28. The gasket 42 allows the lances 26 which are suspended vertically within the compost pile 30 without bottom attachment, freedom of movement to allow the use of front end loaders within the containment structure 12 without damage to the lances 26 contacted or moved thereby.

The lances 26 have lifting hoops 44 connected to the flange 40 and driving points 46 connected at their lower end portions for the ease of removal/insertion of the lances into the compost pile 30. The box beams 28 include openings 48, through which the lances 26 are inserted and removed. The openings 48 include removable caps 50, which can be formed of plastic, rubber or other materials and can be threaded or snap engaged within the opening 48. This arrangement facilitates cleaning, maintenance, adjustment and replacement of the lances 26.

The lances 26 are made of an easily cleanable, non-corrosive material such as stainless steel or the like, for example. Each lance 26 includes a pattern of orifices 52 along its length for the introduction and evacuation of fluid into the compost pile 30. Fluid flow reversal provides for automatic self cleaning of the lances 26.

Lance length, lance spacing, as well as the pattern and size of orifices in the lance are dictated by the compost characteristics, and air flow requirements. Further the size and shape of the containment structure 12 dictates the size of the lances. For example, in an A-Frame containment structure manifolds or beams will be placed at various levels to accommodate the sloping sides to maintain uniform patterns of fluid flow out to edges of the structure. This will also necessitate different lengths of lances which can be formed in interconnecting segments. In an open pile compost arrangement the material to be composted is in a mound form with the mound being higher at the middle portion than at its outer end portions. This type of arrangement dictates shorter lances at the outer end portions and longer lances in the middle portion.

The air distribution system provides substantially uniform patterns of fluid injection and evacuation in a compost pile. These patterns reduce the process fluid path which reduces fluid pressure, and reduces horsepower which in turn lessens energy consumption. The reversing of the fluid flow in the air distribution system provides greater controlling of process conditions to provide a more uniform compost pile by negating the cooling effect of fluid injection in one area which tends to produce dead spots, i.e. non-composting areas.

An improved and more controlled air or fluid flow profile is provided by the lances 26 embodied in the present invention, as more specifically described in FIGS. 5 and 6. Each lance 26 includes an outer air flow wall or tube 54. The tube 54 forms the body of the lance 26 and preferably can be formed from a stainless steel mesh or screen such as sold under the trade name Wedgewire. The grid size can be chosen for the particular compost application, and typically can be on the order of 0.002 inches.

The lance 26 includes a fluid flow characterizing control insert 56. The insert 56 includes the plurality of apertures or openings 52 spaced along the length thereof. The apertures 52 are typically on the order of 0.03 to 0.0625 inches in diameter, which insures that they will not be blocked by particles which can pass through the outer wall 54. The apertures 52 typically have a spacing which varies along sections of the insert 56 to provide the desired fluid flow profile into the compost.

The apertures 52 are illustrated with a first spacing along the length of an insert section 58 and a second spacing along the length of a second insert section 60.

Typically, the compost pile has fresh material toward the top of the pile which requires relatively little air flow. The middle areas generally exhibit a higher degree of activity and require a greater flow for removing oxygen generated by the compost and to control the moisture content in the compost. The lower most areas require the greatest fluid flow for moisture removal. This flow profile is necessary to insure that the reaction takes place in the most controlled and efficient manner.

The density of the compost pile 30 increases from top to bottom due to the weight of the compost material 14, which requires different fluid pressure to equalize the fluid flow into the compost material 14. To equalize or control the fluid flow into the increased compost density, more or larger orifices 52 are formed in the lower portion of the lances 26 to accomplish the desired flow rate. As resistance to the fluid flow decreases in the upper portion of the lances 26, the number or size of the orifices 52 are reduced to equalize the flow rate by causing a higher pressure drop across the orifices 52. Therefor, the orifices 52 generally will be spaced further apart along the top of the lance and closer together along the bottom of the lance 26. The orifices 52 can also be graduated in size from smaller at the top to larger at the bottom of the lance 26.

The improved air flow control profile is provided by the outer wall 54, the insert 56, the apertures 52 along with a plurality of fluid control gaskets or dams 62 (only one of which is illustrated). The gaskets 62 are mounted on the insert 56 and spaced to provide a seal between separate fluid flow zones, such as the sections 58 and 60, which prevents internal short circuiting of the desired fluid flow profile from high to low pressure zones. The gaskets 62 preferably can be made of viton rubber. The insert 56 with the gaskets 62 can just be inserted into and removed from the tube 54 without removal of the tube 54, through the sealable opening 48 in the top of the manifold 24. The insert 56 and gaskets 62 then easily can be removed to adjust for fluid flow changes as needed.

Adjustments in fluid flow can also be effected by a valve 64 illustrated in FIG. 6. The valve 64 is formed from a tube configured to fit inside of the insert 56. The valve 64 includes a plurality of different aperture sets 66, 68 and 70 spaced around the valve 64, which again can vary in size and spacing along the length of the valve 64. The fluid flow profile and volume can be adjusted by rotating the valve 64 to the desired position without removing the insert 56.

Modifications and variations of the present invention are possible in light of the above teachings. The lances 26 can be utilized in numerous compost flow systems and can be mounted in a variety of different ways. For example, it is possible to mount the manifold 24 below the compost pile 30 and have the lances 26 project upward into the compost pile 30. The insert 56 and the valve 64 preferably are formed from stainless steel or other non-corrosive, easily cleanable material. It is therefore, to be understood that within the scope of the appended claims the invention may be practiced otherwise than as specifically described.

I claim:

1. A method of controlling the fluid flow to treat compost, comprising:
    injecting the fluid flow into the compost through at least one lance; and
    providing said lance with an outer porous wall spaced from an inner fluid flow control insert; and providing a plurality of openings in said inner fluid flow control insert and means for separating portions of said insert and said outer wall to form separate fluid flow zones, said openings and said separating means operating to control the fluid flow into said compost along the length of said lance and prevent internal short circuiting of said fluid flow, said separating means including a plurality of gaskets adjustably mounted on said insert to form a plurality of variable zones.

2. The method as defined in claim 1 including adjusting said separating means along the length of said lance to change said fluid flow.

3. The method as deined in claim 1 including varying the spacing of said control insert openings along the length of said lance.

4. The method as defined in claim 1 including evacuating said fluid flow through said lance by reversing said fluid flow.

5. The method as defined in claim 1 including providing a plurality of said lances and injecting and evacuating the fluid flow through said plurality of lances by reversing said fluid flow.

6. The method as defined in claim 1 including providing valve means for controlling the fluid flow through said plurality of openings along the length of said lance.

* * * * *